US010611972B2

(12) United States Patent
Tort et al.

(10) Patent No.: US 10,611,972 B2
(45) Date of Patent: Apr. 7, 2020

(54) DISPERSING ADDITIVE FOR ASPHALTENES AND ITS USES

(71) Applicant: TOTAL MARKETING SERVICES, Puteaux (FR)

(72) Inventors: Frédéric Tort, Brignais (FR); Nicolas Passade-Boupat, Idron (FR); Marianna Rondon, Pau (FR); Carlos Quintero, Pau (FR)

(73) Assignee: TOTAL MARKETING SERVICES, Puteaux (FR)

( * ) Notice: Subject to any disclaimer, the term of this patent is extended or adjusted under 35 U.S.C. 154(b) by 78 days.

(21) Appl. No.: 15/565,660

(22) PCT Filed: Apr. 7, 2016

(86) PCT No.: PCT/EP2016/057553
§ 371 (c)(1),
(2) Date: Oct. 10, 2017

(87) PCT Pub. No.: WO2016/162392
PCT Pub. Date: Oct. 13, 2016

(65) Prior Publication Data
US 2018/0079976 A1 Mar. 22, 2018

(30) Foreign Application Priority Data
Apr. 10, 2015 (FR) ...................... 15 53102

(51) Int. Cl.
| | |
|---|---|
| *C09K 8/524* | (2006.01) |
| *C10G 75/04* | (2006.01) |
| *C08G 8/28* | (2006.01) |
| *C08L 95/00* | (2006.01) |
| *C08G 14/06* | (2006.01) |
| *C08L 61/34* | (2006.01) |
| *C04B 24/30* | (2006.01) |
| *C04B 26/26* | (2006.01) |
| *C08G 8/12* | (2006.01) |

(52) U.S. Cl.
CPC ............ *C10G 75/04* (2013.01); *C04B 24/302* (2013.01); *C04B 26/26* (2013.01); *C08G 8/12* (2013.01); *C08G 8/28* (2013.01); *C08G 14/06* (2013.01); *C08L 61/34* (2013.01); *C08L 95/00* (2013.01); *C09K 8/524* (2013.01); *C08L 2555/80* (2013.01); *C10G 2300/206* (2013.01)

(58) Field of Classification Search
CPC .... C09K 2208/32; C09K 8/524; C09K 8/805; C09K 8/54; C09K 2208/22; C09K 8/588; C09K 2208/20; C09K 2208/28; C09K 8/528; C09K 8/035; C09K 8/52; C09K 8/536; C09K 8/58; C09K 2208/10; C09K 8/584; C09K 8/605; C09K 2208/12; C09K 2208/26; C09K 8/532; C09K 8/594; C09K 8/665; C09K 8/68; C09K 8/88; C09K 8/592; C09K 8/604; C09K 8/92; C09K 15/12; C09K 2208/06; C09K 8/602; C09K 8/685; C09K 8/70; C09K 8/80; C09K 8/882; C09K 8/885; C09K 8/905; C09K 2208/08; C09K 8/03; C09K 8/42; C09K 8/422; C09K 8/467; C09K 8/50; C09K 8/512; C09K 8/514; C09K 8/516; C09K 8/60; C09K 8/62; C09K 8/74; C09K 8/86; C09K 8/887; C09K 8/90; C09K 8/94; E21B 43/267; E21B 37/06; E21B 41/02; E21B 37/00; E21B 43/16; E21B 43/162; E21B 43/26; E21B 47/1015; E21B 21/00; E21B 21/068; E21B 33/13; E21B 41/00; E21B 33/068; E21B 43/121; E21B 43/126; E21B 43/168; E21B 43/20; E21B 43/2406; E21B 49/08

See application file for complete search history.

(56) References Cited

U.S. PATENT DOCUMENTS

| | | | |
|---|---|---|---|
| 4,178,951 | A | 12/1979 | Sweeney |
| 4,567,222 | A | 1/1986 | Hagenbach et al. |
| 4,758,365 | A | 7/1988 | Neunier et al. |
| 5,021,498 | A | 6/1991 | Stephenson et al. |
| 5,120,777 | A | 6/1992 | Chaverot et al. |
| 5,494,607 | A | 2/1996 | Manek et al. |
| 5,508,112 | A | 4/1996 | Planche et al. |
| (Continued) | | | |
| 5,998,530 | A | 12/1999 | Krull et al. |
| 2006/0230981 | A1 | 10/2006 | Dean |
| 2007/0094920 | A1 | 5/2007 | Ahlers et al. |
| 2009/0090655 | A1* | 4/2009 | Stark ................. C08G 8/12 208/290 |
| 2009/0137705 | A1 | 5/2009 | Faucon Dumont et al. |
| 2010/0275508 | A1 | 11/2010 | Dolmazon et al. |
| 2010/0281762 | A1 | 11/2010 | Chevrot et al. |
| 2013/0255139 | A1* | 10/2013 | Dolmazon .............. C08G 8/12 44/307 |

FOREIGN PATENT DOCUMENTS

| | | |
|---|---|---|
| EP | 0 311 452 A2 | 4/1989 |
| EP | 0 360 656 A1 | 3/1990 |
| (Continued) | | |

OTHER PUBLICATIONS

Jul. 6, 2016 Search Report issued in International Patent Application No. PCT/EP2016/057553.

(Continued)

*Primary Examiner* — Kumar R Bhushan
(74) *Attorney, Agent, or Firm* — Oliff PLC (57) ABSTRACT

Use of an alkylphenol-aldehyde resin modified by at least one alkylamine in a composition of crude oils or in a product derived from a composition of crude oils as dispersing additive for asphaltenes. Process for the treatment of a composition of crude oils or a derived product which makes it possible to prevent the precipitation of asphaltenes, in particular in crude oils and the products which result therefrom by refining and/or extraction processes. Bituminous compositions including an alkylphenol-aldehyde resin modified by at least one alkylamine.

20 Claims, 1 Drawing Sheet

(56) References Cited

U.S. PATENT DOCUMENTS

| | | | |
|---|---|---|---|
| 2013/0310492 A1* | 11/2013 | Morgan | C04B 26/26 524/59 |
| 2015/0113863 A1 | 4/2015 | Papin et al. | |
| 2016/0068776 A1 | 3/2016 | Papin et al. | |

FOREIGN PATENT DOCUMENTS

| | | |
|---|---|---|
| EP | 0 409 683 A1 | 1/1991 |
| EP | 0 690 102 A1 | 1/1996 |
| EP | 0 857 776 A1 | 8/1998 |
| EP | 1 584 673 A1 | 10/2005 |
| EP | 1 692 196 B1 | 8/2008 |
| EP | 2 062 941 A1 | 5/2009 |
| EP | 2 192 158 A1 | 6/2010 |
| FR | 2 528 439 A1 | 12/1983 |
| WO | 2004/108830 A1 | 12/2004 |
| WO | 2007/135097 A1 | 11/2007 |
| WO | 2009/062925 A1 | 5/2009 |
| WO | 2009/106743 A2 | 9/2009 |
| WO | 2009/106744 A2 | 9/2009 |
| WO | 2012/085865 A1 | 6/2012 |
| WO | 2013/189868 A1 | 12/2013 |
| WO | 2014/173844 A1 | 10/2014 |

OTHER PUBLICATIONS

Jul. 6, 2016 Written Opinion issued in International Patent Application No. PCT/EP2016/057553.

Kraiwattanawong, Kriangkrai et al., "Effects of Asphaltene Dispersants on Aggregate Size Distribution and Growth," Energy & Fuels, vol. 23, pp. 1575-1582, 2009.

* cited by examiner

DISPERSING ADDITIVE FOR ASPHALTENES AND ITS USES

TECHNICAL FIELD

The present invention relates to the use of a modified alkylphenol-aldehyde resin in a crude oil composition or in a product derived from a crude oil composition, as dispersing additive for asphaltenes. It also relates to a process for the treatment of a crude oil composition or of a derived product which makes it possible to prevent the precipitation of asphaltenes, in particular in crude oils and the products which result therefrom by refining and/or extraction processes.

The invention relates in particular to the additivation of a bituminous binder with a modified alkylphenol-aldehyde resin which makes it possible to reduce the temperatures of manufacture, processing and compacting of mixes and to reduce the temperatures of manufacture and processing of asphalts. The invention relates to a process for the low-temperature preparation of mixes and asphalts and also to the mixes and asphalts obtained from the said process. The invention also relates to the bituminous compositions additivated using a modified alkylphenol-aldehyde resin.

Finally, the invention relates to the use of these bituminous binders, mixes or asphalts in the manufacture of coatings.

Prior State of the Art

A crude oil mainly comprises two categories of products: maltenes and asphaltenes, the maltenes having, as main constituents: oils (saturated hydrocarbon compounds and aromatics) and resins. The asphaltenes comprise highly polar entities which have a tendency to combine together to form agglomerates. They constitute the heaviest component of crude oils. Asphaltenes are composed of molecules comprising fragments of polycycles, polyaromatics, short aliphatic chains, heteroatoms, such as N, O or S, and metals (for example Ni, V or Fe). They are insoluble in alkanes, such as n-pentane or n-heptane, but they are soluble in aromatic solvents, such as toluene or xylene. The interaction of asphaltenes with their environment is a complex phenomenon which is difficult to control.

The precipitation of asphaltenes can occur in production wells, in pipelines and in surface installations. The asphaltenes present in crude oils or in heavy residues, resulting from refining operations, can precipitate and cause problems of clogging of filters or of plugging of pipes. This phenomenon results in a loss in productivity and a reduction in the transportation flows. Without a treatment which makes it possible to prevent this phenomenon, it is necessary to dismantle the plants for the refining and transportation of crude oils and the frequency of the operations for the maintenance of the production sites and of the transportation plants represents a major economic burden.

The main factors which promote the precipitation of the asphaltenes are: a rise in pressure, a rise in temperature, variations in composition, in particular due to injection of material into the crude oil or into the derived product, for example the arrival of a drilling mud in the reservoir, a mixture of crude oils or an injection of gas or of another fluid.

The composition of the crude oil or of the derived product also influences the phenomenon of precipitation of the asphaltenes: light oils, exhibiting a low content of asphaltenes, are rich in alkanes in which asphaltenes are not very soluble, and the latter have a tendency to precipitate from this medium. Heavy oils, rich in asphaltenes, comprise high amounts of intermediate compounds, such as resins, which are good solvents for asphaltenes and delay or prevent their precipitation. However, in crude oils, the precipitation of asphaltenes often brings about the coprecipitation of other components, such as resins or waxes.

In underground formations, the injection of fluids and the application of high pressures result in the adsorption of residues on the rock and a fall in the permeability which can bring about blocking of the reservoir. During the refining operations, the rise in temperature applied to the crude oils causes problems of coking and of fouling in the distillation columns and on the heat exchangers, and also deactivation of catalysts. During the transportation of the oil products (crude and refined), the pressure applied to the fluid can result in the sealing of the pipes. These phenomena are largely attributable to the precipitation of the asphaltenes. The losses in production and the remediable operations which result therefrom represent major costs.

The problem which the invention intends to solve is that of providing a novel additive which is effective in dispersing the asphaltenes responsible for the operating difficulties described above on sites for the production and in plants for the transportation and refining of crude oils or heavy residues.

Additives are known and are currently used to limit the precipitation of asphaltenes. In particular, ungrafted alkylphenol resins have been described for this use in the paper Energy & Fuels, 2009, 23, 1575-1582, and in U.S. Pat. No. 5,021,498. Polyethylenepolyamine-formaldehyde alkylphenol resins have been described in U.S. Pat. No. 5,494,607 for the same application.

The effectiveness of the existing additives depends on the quality of the oils and on the chemical structure of the asphaltenes. These additives are specific to the type of oil to be treated and are not effective over a broad palette of crude oils and derived products. Furthermore, depending on the quality of the oils, their effectiveness is limited. In particular, crude oils can be more or less difficult to treat depending on their content of asphaltenes. Some additives are ineffective or have to be employed with an excessively high degree of treatment, which represents a slight or nonexistent economic advantage.

Modified alkylphenol-aldehyde resins, obtained by a Mannich reaction of an alkylphenol-aldehyde condensation resin with at least one aldehyde and at least one hydrocarbon compound having at least one alkylamine group, are known for their use in fuel compositions, as WASA antisettling additives (WO2012/085865), for the resistance to low temperatures (WO2013/189868) and as antioxidant (WO2014/173844). In the documents WO2012/085865 and WO2013/189868, the technical effect described consists in preventing the formation and the precipitation, or the sedimentation, of paraffin crystals, in particular at low temperatures. The document WO2014/173844 teaches that these compounds prevent the oxidation of unstable molecules sensitive to oxidation, which are mainly molecules containing unsaturations, such as, for example, olefins in petrols, fatty acid methyl or ethyl esters (FAME and FAEE), animal fatty esters or other sources of triglycerides in biodiesels or also olefins and partially hydrogenated aromatics in the distillate fractions resulting from the catalytic or thermal cracking of the products resulting from the refining of oil. However, these applications relate to the stabilization of molecules (paraffins, fatty esters, olefins), the structure of which is very different from that of the asphaltenes and which precipitate under the effect of physicochemical factors which are very different from, indeed even opposite, those which bring about the precipitation of asphaltenes.

In particular, in the case of paraffins, precipitation is observed at low temperatures, whereas the precipitation of asphaltenes is observed at high temperatures. In addition, the additives exhibiting a noteworthy effectiveness as dispersants of paraffins, such as polyacrylates and polyisobutylene succinic anhydrides, exhibit a limited effectiveness as dispersants for asphaltenes, in particular when they are used in crude oils or in derived products.

Document US 2013/031092 describes additives to enhance the physical properties of bitumen. These additives comprise a first component chosen among (alkoxylated)-(di or tri-alkyl)-(aminated) phenol-aldehyde resins or an α-olefin/maleic anhydride copolymer and a second component chosen among polyamines, amidoamines, imidazolines, these two compounds having synergetic effects. Thus, none of the documents of the prior art mentions or suggests that modified alkylphenol-aldehyde resins, capable of being obtained by a Mannich resin of an alkylphenol-aldehyde condensation resin with at least one aldehyde and at least one hydrocarbon compound having at least one alkylamine group, are capable of improving the dispersion and of preventing the precipitation of asphaltenes.

The additivation of bituminous binder compositions, of mixes or of asphalt compositions with dispersing additives is known from the prior art.

The preparation of hot mixes or of asphalts comprises several stages. The first stage consists in mixing the bituminous binder with aggregates (for the mixes) or with fillers (for the asphalts) at a "manufacturing" temperature or coating temperature. The bituminous binder/aggregates mixture or the bituminous binder/fillers mixture is subsequently spread (for the mixes) or poured (for the asphalts) at a "processing" temperature. For the bituminous mixes, there subsequently exists a stage of compacting at a "compacting" temperature. After the compacting of the bituminous mix or the pouring of the asphalt, the bituminous mix or the asphalt is cooled to ambient temperature.

The various temperatures employed in the preparation of conventional mixes and asphalts are very high. Thus, for bituminous mixes, the manufacturing temperature (or coating temperature) and the processing temperature are between 160° C. and 180° C. and the compacting temperature is between 120° C. and 150° C. For asphalts, these temperatures are even higher; the manufacturing temperature (or coating temperature) and the processing temperature are between 200° C. and 250° C.

These relatively high temperatures result in high energy costs, produce emissions of greenhouse gases and of volatile organic compounds and make the working conditions difficult because of the radiation and gas emissions.

"Cold" techniques have been provided. These techniques are based on the use of bituminous emulsions, dispersions of bitumen in water. However, the mechanical performances obtained via these "cold" techniques are generally somewhat inferior, compared with the "hot" techniques.

Another route for lowering the temperatures for the preparation of hot mixes and asphalts is based on intermediate "tepid" techniques based on the additivation of the bituminous binder. Various solutions, based on the additivation of the bituminous binder, have already been provided:

hydrocarbon waxes having a melting point of greater than 85° C. (EP 0 690 102), a combination of a hydrocarbon wax, the melting point of which is greater than 85° C., and of a wax of ester of fatty acids, of synthetic, plant or fossil plant origin and having a melting point of less than 85° C. (WO2004108830), a combination of a macromolecular compound, chosen from natural resins of plant origin or hydrocarbon waxes, with a fatty acid derivative chosen from the group consisting of fatty acid diesters and fatty acid ethers (WO2007135097), a fatty acid triglyceride (EP 2 192 158), a combination of additives comprising a surface-active and rheology-modifying agent comprising a wax and a resin (WO2009062925), at least 10% by weight of glycerol (EP 2 062 941) in a bituminous binder.

However, the need remains for alternative compounds to the currently existing additives which make it possible to decrease the temperatures for the manufacture, processing and compacting of mixes and the temperatures for the manufacture and processing of asphalts.

The invention is based on the fact that, by involving a bituminous binder additivated with at least one modified alkylphenol-aldehyde resin, the preparation of mixes or asphalts can be carried out at lower temperatures.

SUMMARY OF THE INVENTION

A first subject-matter of the invention is the use of at least one modified alkylphenol-aldehyde resin in a composition of crude oils or in a product derived from a composition of crude oils and comprising asphaltenes for dispersing the asphaltenes and/or for preventing and/or delaying and/or stopping and/or reducing the precipitation of asphaltenes, the said modified alkylphenol-aldehyde resin being capable of being obtained by a Mannich reaction of an alkylphenol-aldehyde condensation resin with at least one aldehyde and/or one ketone having from 1 to 8 carbon atoms, preferably from 1 to 4 carbon atoms;

and at least one hydrocarbon compound having at least one alkylamine group having between 1 and 30 carbon atoms, preferably between 4 and 30 carbon atoms, the said alkylphenol-aldehyde condensation resin being itself capable of being obtained by condensation of at least one alkylphenol substituted by at least one linear or branched alkyl group having from 1 to 30 carbon atoms, preferably a monoalkylphenol, with at least one aldehyde and/or one ketone having from 1 to 8 carbon atoms, preferably from 1 to 4 carbon atoms.

A further subject-matter of the invention is the use of a modified alkylphenol-aldehyde resin as defined above in a composition of crude oils or in a product derived from a composition of crude oils as dispersing additive for asphaltenes.

A further subject-matter of the invention is a composition comprising asphaltenes chosen from: bituminous compositions, bituminous binders, bituminous mixes and asphalts, the said composition comprising at least one modified alkylphenol-aldehyde resin as defined above.

A further subject-matter of the invention is a process for the treatment of a composition of crude oils or of a product derived from a composition of crude oils and comprising asphaltenes, this process comprising at least:

(i) the introduction of at least one modified alkylphenol-aldehyde resin as defined above into the composition of crude oils or into the product derived from the composition of crude oils and comprising asphaltenes, (ii) a treatment stage chosen from: a rise in pressure, a rise in temperature or a mixing with at least one other fluid.

According to a preferred embodiment of the invention, the latter is employed in a composition of crude oils or in a product derived from a composition of crude oils and comprising asphaltenes subjected to one or more of the following conditions:
- a rise in pressure,
- a rise in temperature,
- a mixing with at least one other fluid.

According to a preferred embodiment of the invention, the modified alkylphenol-aldehyde resin is capable of being obtained from p-nonylphenol, formaldehyde and at least one hydrocarbon compound having at least one alkylmonoamine or alkylpolyamine group.

According to a preferred embodiment of the invention, the modified alkylphenol-aldehyde resin is obtained from at least one alkylmonoamine or from at least one alkylpolyamine having at least one primary amine group.

Advantageously, according to this embodiment, the modified alkylphenol-aldehyde resin is obtained from at least one alkylmonoamine or from at least one alkylpolyamine which all the amine groups are primary amines.

According to a first preferred alternative form of the invention, the alkylamine is a fatty alkylmonoamine having from 12 to 24 carbon atoms, preferably from 12 to 22 carbon atoms.

According to another preferred alternative form of the invention, the alkylamine is a fatty alkylpolyamine having from 12 to 24 carbon atoms, preferably from 12 to 22 carbon atoms.

According to a preferred embodiment of the invention, the modified alkylphenol-aldehyde resin is employed diluted in a solvent, preferably in an aromatic solvent, or in an oil.

According to a preferred embodiment of the invention, the modified alkylphenol-aldehyde resin is employed in a composition of crude oils or in a hydrocarbon fraction of crude oils comprising asphaltenes.

According to a preferred embodiment, the invention is employed in an equipment chosen from: a tank, a refining plant, a pipeline, a drilling well, a storage vessel, a transportation equipment or a filter.

According to a preferred embodiment of the invention, the modified alkylphenol-aldehyde resin is employed in a product derived from a composition of crude oils chosen from: bituminous binders, bituminous mixes and asphalts.

According to a preferred embodiment of the invention, the modified alkylphenol-aldehyde resin is employed in order to reduce the preparation temperature and/or the processing temperature of the bituminous binder and/or to reduce the manufacturing, processing and/or compacting temperatures during the preparation of a bituminous mix and/or to reduce the manufacturing and/or processing temperatures during the preparation of an asphalt.

According to a preferred embodiment, the composition is a bituminous binder comprising from 0.1 to 5% by weight of modified alkylphenol-aldehyde resin, with respect to the total weight of binder.

According to a preferred embodiment, the composition is a bituminous mix comprising from 1 to 10% by weight of bituminous binder and from 90 to 99% by weight of aggregates, with respect to the total weight of the mix.

According to a preferred embodiment, the composition is an asphalt comprising from 1 to 20% by weight of bituminous binder and from 80 to 99% by weight of fillers, with respect to the total weight of the asphalt.

According to a preferred embodiment, the composition chosen from bituminous binders, mixes and asphalts is employed in the manufacture of surfacing of roads, of carriageways, of pavements, of roadways, of urban developments, of ground surfaces, of watertightness of buildings or of works, in particular in the manufacture in the application to roads of foundation courses, base courses, bedding courses, surface courses, such as binder courses and/or wearing courses.

According to a preferred embodiment of the process of the invention, stages (i) and (ii) are carried out successively.

According to a preferred embodiment of the process of the invention, stage (ii) is chosen from: an extraction of a crude oil from a reservoir, a stage of refining a crude oil or a derived product, a transportation of a crude oil or of a derived product, a filtration of a crude oil or of a derived product, an injection of gas into a crude oil or into a derived product, a mixing of crude oils or of derived products, or a mixing of a crude oil or of a derived product with a solvent.

According to a preferred embodiment, the process of the invention is carried out in a equipment chosen from: a tank, a drilling well, a refining plant, a pipeline, a storage vessel, a transportation equipment or a filter.

According to a preferred embodiment, the process of the invention is employed in the preparation of a bituminous binder and comprises a stage (ii) of mixing the bitumen and the modified alkylphenol-aldehyde resin in which the temperature at which this mixing is carried out is between 100° C. and 170° C.

According to a preferred embodiment, the process of the invention is employed in the preparation of a mix and comprises a stage (ii) of mixing the bituminous binder and the aggregates, the mixing temperature being between 100° C. and 150° C.

According to a preferred embodiment, the process of the invention is employed in the preparation of an asphalt and comprises a stage (ii) of mixing the bituminous binder and fillers, the mixing temperature being between 140° C. and 180° C.

These additives, of modified alkylphenol-aldehyde resin type of the invention, have the role of keeping the asphaltenes dispersed in the hydrocarbon matrix and avoiding or delaying the phenomena of agglomeration and precipitation of asphaltenes.

Contrary to some additives of modified phenol-aldehyde resin type of the prior art which are obtained by a one-step process, resins used in the invention have been obtained by a two-steps process, which permits to control the molecular mass of the resin as well as the grafting of the amine functions.

The additives of the invention exhibit numerous advantages and in particular: they are more effective than the additives based on alkylphenol-aldehyde resins already known in the treatment of asphaltenes, they are effective over a great variety of crude oils, of varied compositions, and they are effective in a small amount.

These additives make it possible to significantly reduce the manufacturing, processing and compacting temperatures of the processes for the preparation of mixes and the manufacturing and processing temperatures of the processes for the preparation of asphalts. As the preparation process according to the invention is a process of anhydrous type which does not involve supplying external water, only the additivation of a binder makes it possible to reduce the manufacturing temperatures.

The additives of the invention are relatively inexpensive to employ as, being more effective, they are added in small amounts and are thus more economical.

The additives of the invention make possible the preparation of mixes and mastic asphalts at lower temperatures, the properties of the additivated binder being unmodified or only slightly modified in comparison with the nonadditivated base bitumen.

The process for the preparation of mixes and mastic asphalts at lower temperatures makes it possible to ensure good adhesiveness between the additivated bituminous binder and the aggregates and makes it possible to obtain a mix exhibiting a good resistance to stripping, a good resistance to rotting and a good modulus of stiffness.

It makes it possible to obtain an asphalt manufactured at a low temperature, having the required indentation and shrinkage values.

The process for the preparation of mixes and mastic asphalts at low temperatures according to the invention is an anhydrous process.

DETAILED DESCRIPTION

The Modified Alkylphenol-Aldehyde Resin:

The modified alkylphenol-aldehyde resin is capable of being obtained by a Mannich reaction of an alkylphenol-aldehyde condensation resin with
  at least one aldehyde and/or one ketone having from 1 to 8 carbon atoms, preferably from 1 to 4 carbon atoms;
  and at least one hydrocarbon compound having at least one alkylmonoamine or alkylpolyamine (alkylamine) group having between 1 and 30 carbon atoms, preferably between 4 and 30 carbon atoms, the said alkylphenol-aldehyde condensation resin being itself capable of being obtained by condensation
  of at least one alkylphenol substituted by at least one linear or branched alkyl group having from 1 to 30 carbon atoms, preferably a monoalkylphenol,
  with at least one aldehyde and/or one ketone having from 1 to 8 carbon atoms, preferably from 1 to 4 carbon atoms.

The alkylphenol-aldehyde condensation resin can be chosen from any resin of this type already known and in particular those described in the documents EP 857 776 and EP 1 584 673.

The modified alkylphenol-aldehyde resin according to the invention is advantageously obtained from at least one para-substituted alkylphenol. Use is preferably made of nonylphenol.

The main number of phenol nuclei per molecule of nonylphenol-aldehyde resin is preferably greater than 6 and less than or equal to 25, more preferably between 8 and 17 and more preferably still between 9 and 16 phenol nuclei per molecule. The number of phenol nuclei can be determined by nuclear magnetic resonance (NMR) or gel permeation chromatography (GPC).

Advantageously, the modified alkylphenol-aldehyde resin is obtained by employing one and the same aldehyde or one and the same ketone in both stages of its preparation.

According to a preferred embodiment, the modified alkylphenol-aldehyde resin can be obtained from at least one aldehyde and/or one ketone chosen from formaldehyde, acetaldehyde, propionaldehyde, butyraldehyde, 2-ethylhexanal, benzaldehyde or acetone. Preferably, the modified alkylphenol-aldehyde resin can be obtained from at least formaldehyde.

According to a specific embodiment, the modified alkylphenol-aldehyde resin is obtained from at least one alkylamine having at least one primary and/or secondary amine group. In particular, the alkylamine is advantageously chosen from primary or secondary amines respectively substituted by one or two alkyl groups preferably comprising from 12 to 24 carbon atoms, more preferably from 12 to 22 carbon atoms.

According to a preferred alternative form, the modified alkylphenol-aldehyde resin is obtained from at least one alkylamine having at least one primary amine group.

In particular, the modified alkylphenol-aldehyde resin can advantageously be obtained from at least one alkylamine or from at least one alkylpolyamine, all the amine groups of which are primary amines.

The alkylamine is preferably an alkylamine or an alkylpolyamine comprising a fatty chain having from 12 to 24 carbon atoms, preferably from 12 to 22 carbon atoms.

According to another preferred alternative form, the modified alkylphenol-aldehyde resin is obtained from at least one alkylamine or one alkylpolyamine having at least one primary amine group and comprising a fatty chain having from 12 to 24 carbon atoms, preferably from 12 to 22 carbon atoms.

The commercial alkylamines are generally not pure compounds but mixtures. Mention may in particular be made, among the marketed alkylamines which are suitable, of the alkylamines comprising a fatty chain sold under the Noram®, Trinoram®, Duomeen®, Dinoram®, Triameen®, Armeen®, Polyram®, Lilamin® and Cemulcat® names.

Mention may be made, as preferred example, of Trinoram® S, which is a tallow dipropylenetriamine, also known under the name N-(tallowalkyl)dipropylenetriamine.

The Crude Oils and the Derived Products:

The invention relates to the treatment of a composition of crude oils or of a derived product comprising asphaltenes. Bitumens can represent a specific case of compositions of crude oils, characterized by their high viscosity.

The term "product derived from a composition of crude oils" is understood to mean both a fraction resulting from a composition of crude oils by a fractionation method, such as, for example, refining or extraction, and also any product which results therefrom by mixing with other components, such as, for example, an additivated bituminous composition.

According to a first embodiment, the medium to be treated can be any composition of crude oils comprising asphaltenes and in particular a composition located in an underground reserve, a composition of crude oils extracted from the ground, a bitumen composition, or any hydrocarbon fraction resulting from a composition of crude oils by a fractionation method, such as, for example, refining or extraction. According to the invention, the following are included in the bitumens: bitumens of natural origin, those present in natural bitumen or natural asphalt deposits, or bituminous sands. The invention also relates to the bitumens originating from the refining of crude oil, in particular from the atmospheric and/or vacuum distillation of oil, it being possible for these bitumens to optionally be blown, visbroken and/or deasphalted and/or mixed. Bituminous binders are included in the products derived from the compositions of crude oils.

The term "bituminous binder" is understood to mean the binders obtained directly from natural crude oils or else from the treatment of natural crude oils. These bituminous binders can be obtained by different processes for the refining of crude oils (atmospheric distillation; vacuum distillation).

The invention is targeted at avoiding, preventing, delaying or reducing the precipitation of asphaltenes. This phenomenon can concern compositions having highly varied contents of asphaltenes, given that the phenomenon of precipitation of asphaltenes is due to the presence of these compounds but also to the presence or to the absence of other components. For example, in crude oils, the alkanes promote the precipitation of the asphaltenes and the resins contribute to their dissolution. The mixing of crude oils of different compositions can result in precipitation of the heaviest compounds, such as the asphaltenes.

According to a second embodiment, the medium to be treated can be an asphalt or bituminous mix composition or a bituminous binder for its use in an asphalt or bituminous mix composition.

The term "asphalt" is understood to mean a mixture of bituminous binder with inorganic fillers. The inorganic fillers are composed of fines (particles with dimensions of less than 0.063 mm), of sand (particles with dimensions of between 0.063 mm and 2 mm) and optionally of gravel (particles with dimensions of greater than 2 mm, preferably of between 2 mm and 4 mm).

The term "bituminous mix" is understood to mean a mixture of bituminous binder with aggregates and optionally inorganic fillers. The aggregates are inorganic and/or synthetic aggregates, in particular recycled milled mixers, with dimensions of greater than 2 mm, preferably of between 2 mm and 14 mm.

The asphalts are mainly used to construct and cover pavements, while the mixes are used to construct roads. In contrast to the mixes, the asphalts are not compacted with a roller during their positioning.

Additive Composition Comprising Modified Alkylphenol-Aldehyde Resin:

Suitable compositions based on modified alkylphenol-aldehyde resin are formulated depending on the embodiment of the invention.

Additive Composition for Crude Oils and the Hydrocarbon Fractions Resulting from Crude Oils:

According to a first preferred embodiment, the modified alkylphenol-aldehyde resin is used in a form diluted in a solvent or a dispersant. This embodiment relates to the additivation of the compositions of crude oils and of the hydrocarbon fractions which result therefrom.

By way of example, the solvent or the dispersant is chosen from aliphatic and/or aromatic hydrocarbons and mixtures of hydrocarbons, for example petrol fractions, kerosene, decane, pentadecane, toluene, xylene, ethylbenzene or the commercial mixtures of solvents, such as Solvarex 10®, Solvarex 10 LN®, Solvent Naphtha®, Shellsol AB®, Shellsol D®, Solvesso 150®, Solvesso 150 ND®, Solvesso 200®, Exxsol® or Isopar®. The solvent or the dispersant is preferably aromatic.

The composition can also contain, in addition to the solvent, a polar dissolution adjuvant, such as 2-ethylhexanol, decanol, isodecanol and/or isotridecanol.

The concentration by weight of the modified alkylphenol-aldehyde resin diluted in the solvent or the dispersant can advantageously vary from 1 to 99.5%, preferably from 5 to 95%, or preferably from 10 to 90% and more preferably still from 30 to 90%.

The viscosity of the modified alkylphenol-aldehyde condensation resin, diluted with 30% by weight of aromatic solvent, measured at 50° C. using a dynamic rheometer with a shear rate of 100 s$^{-1}$, is preferably between 1000 and 10 000 mPa·s, preferably between 1500 and 6000 mPa·s and advantageously between 2500 and 5000 mPa·s.

The modified alkylphenol-aldehyde resin can also be used in a composition in combination with one or more additional additives.

Mention may be made, as additional additives capable of being used in combination with the modified alkylphenol-aldehyde resin, of: dispersants/detergents, metal passivators, antioxidants, corrosion inhibitors, biocides, demulsifiers, antifoam agents, paraffin deposition inhibitors, pour point lowering agents, paraffin anti-settling additives, $H_2S$ scavengers, organic deposit inhibitors, such as naphthenic acids, mineral deposit inhibitors, labels, heat stabilizers, emulsifiers, friction reducers, surfactants, reodorants and their mixtures.

Mention may in particular be made, among the other additional additives, of:

a) antifoam additives, in particular (but nonlimitingly) chosen from polysiloxanes, oxyalkylated polysiloxanes and amides of fatty acids resulting from vegetable or animal oils;

b) detergent additives and/or corrosion inhibitors, in particular (but nonlimitingly) chosen from the group consisting of amines, succinimides, alkenylsuccinimides, polyalkylamines, polyalkylpolyamines, polyetheramines and imidazolines;

c) lubricating additives or antiwear agents, in particular (but nonlimitingly) chosen from the group consisting of fatty acids and their ester or amide derivatives, in particular glycerol monooleate, and derivatives of mono- and polycyclic carboxylic acid;

d) crystallization-modifying additives, additives which inhibit paraffin deposits, additives which lower the pour point; modifiers of the rheology at low temperature, such as ethylene/vinyl acetate (EVA) and/or ethylene/vinyl propionate (EVP) copolymers, ethylene/vinyl acetate/vinyl versatate (E/VA/VeoVA) terpolymers; ethylene/vinyl acetate/alkyl acrylate terpolymers; EVA copolymers modified by grafting; polyacrylates; acrylates/vinyl acetate/maleic anhydride terpolymers; amidated maleic anhydride/alkyl (meth) acrylate copolymers capable of being obtained by reaction of a maleic anhydride/alkyl (meth)acrylate copolymer and of an alkylamine or polyalkylamine having a hydrocarbon chain of 4 to 30 carbon atoms, preferably of 12 to 24 carbon atoms; amidated α-olefin/maleic anhydride copolymers capable of being obtained by reaction of an α-olefin/maleic anhydride copolymer and of an alkylamine or polyalkylamine, it being possible for the α-olefin to be chosen from $C_{10}$-$C_{50}$ α-olefins, preferably from $C_{16}$-$C_{20}$ α-olefins, and the alkylamine or the polyalkylamine advantageously having a hydrocarbon chain of 4 to 30 carbon atoms, preferably of 12 to 24 carbon atoms. Mention may be made, as examples of terpolymers, of those which are described in EP01692196, WO2009/106743, WO2009/106744, U.S. Pat. Nos. 4,758,365 and 4,178,951.

e) antioxidants, for example of hindered phenolic type or aminated of alkylated para-phenylenediamine type;

f) metal passivators;

g) acidity neutralizers.

Additive Composition for the Products Derived from Bitumens:

According to a second preferred embodiment, the invention relates to the products derived from bitumens, such as mixes and asphalts. The modified alkylphenol-aldehyde resin additive is advantageously introduced into the bitumen in the pure form (that is to say, as is) or diluted in an oil. This oil can be synthetic or of mineral or vegetable origin or a combination of the three. This oil does not evaporate and its presence does not modify the properties of the final bituminous binder. The percentage of oil can be between 0 and 50% by weight of the oil plus additive mixture and preferably between 20 and 50% by weight.

In addition to the additives a) to g) described above, the additive composition for the products derived from the bitumens can also comprise one or more additives chosen from:

h) the additives which make it possible to lower the temperature of mixing the asphalts and mixes, those making it possible to improve the adhesion of the bituminous binders to the fillers and aggregates, such as, for example, polyisobutylenesuccinim ides.

Process for the Treatment of Crude Oils and of the Derived Products:

The invention also relates to a process for the treatment of a composition of crude oils or of a product derived from a composition of crude oils and comprising asphaltenes, this process comprising at least:

(i) the introduction of at least one modified alkylphenol-aldehyde resin into the composition of crude oils or into the product derived from the composition of crude oils and comprising asphaltenes, (ii) a treatment stage chosen from: a rise in pressure, a rise in temperature or a mixing with at least one other fluid.

According to the invention, the two stages can be carried out simultaneously or successively. Preferably, stage (ii) is carried out after stage (i). When the two stages are carried out successively, it is possible to provide one or more intermediate stages after stage (i) and before stage (ii).

Implementation in Compositions of Crude Oils and Hydrocarbon Fractions:

In the case of crude oils and the hydrocarbon fractions which result therefrom, for example by refining or extraction, the treatment can be carried out at any stage from the recovery of the crude oils from a reservoir up to the refining and the use of the hydrocarbon fractions, via the transportation of these different products. The invention is targeted at keeping the asphaltenes in dispersion in the medium, so as to improve the recovery of the crude oils, to stop, prevent, decrease or delay the precipitation of the asphaltenes, the formation of asphaltene deposits, the fouling, in the tanks, the treatment and transportation plants, such as the extraction or refining equipment, the pipelines, the pipes of all types, the filters or the storage vessels.

Advantageously, the composition of crude oils or the hydrocarbon fraction of crude oils is additivated with an amount of modified alkylphenol-aldehyde resin of between 1 and 5000 ppm by weight, preferably between 10 and 2000 ppm, more preferably between 50 and 1500 ppm and more preferably still between 100 and 1200 ppm.

Stage (ii) can, without implied limitation, correspond to a pressurization, for example in a pipeline or any type of pipe, or through a filter; it can comprise a heating in a refining plant, an injection of a gas or a mixing with another variety of crude oil or with another grade of heavy oil resulting from the refining.

Conventionally, such treatment stages result in a precipitation of the asphaltenes and a fouling and/or a clogging of the plants. The modified alkylphenol-aldehyde resin additives of the invention make it possible to keep the asphaltenes in dispersion during these treatment stages and improve the compatibility of the asphaltenes with the non-asphaltenic part of the oil. These additives thus make it possible to avoid or else to limit the phenomena of agglomeration or flocculation of the asphaltenes.

Implementation in Bituminous Compositions:

Bituminous compositions, such as bituminous binder, mix or asphalt, are characterized by hot mixing stages, for which the introduction of the modified alkylphenol-aldehyde resin additive exhibits the advantage of making possible efficient mixing at a lower temperature, in comparison with the previous compositions, without damaging the usual properties of these compositions.

Process for the Preparation of a Bituminous Binder:

The invention also relates to a process for the preparation of bituminous binder as defined above, comprising the mixing of the bitumen and the modified alkylphenol-aldehyde resin. Other components, usual additives of bituminous binders, described below, can also be present in this mixture. Preferably, in this process, the temperature at which this mixing is carried out is between 100° C. and 170° C., preferably between 110° C. and 150° C., more preferably between 120° C. and 130° C. The duration of mixing is between 10 minutes and 4 hours, preferably between 30 minutes and 3 hours and more preferably between 1 hour and 2 hours.

The invention also relates to the use of a modified alkylphenol-aldehyde resin in a bituminous binder comprising at least one bitumen, in order to decrease the temperature of preparation of the bituminous binder.

Process for the Preparation of a Mix:

The invention relates to a process for the preparation of a bituminous mix comprising the mixing of a bituminous binder with aggregates, the bituminous binder comprising at least one bitumen and at least one modified alkylphenol-aldehyde resin of the invention.

Preferably, in this process, the bituminous binder comprises from 0.1 to 5% by weight of modified alkylphenol-aldehyde resin, preferably from 0.5 to 3% by weight and more preferably from 0.5 to 2% by weight, with respect to the total weight of bituminous binder.

Advantageously, the temperature for mixing the bituminous binder and the aggregates is between 100° C. and 150° C., preferably between 110° C. and 140° C. and more preferably between 120° C. and 130° C.

Preferably, the bituminous binder and the aggregates are both at a temperature of between 100° C. and 150° C., preferably between 110° C. and 140° C. and more preferably between 120° C. and 130° C., during the mixing.

During the mixing, the aggregates and the additivated bituminous binder are either both at the same temperature, between 100° C. and 150° C., preferably between 110° C. and 140° C. and more preferably between 120° C. and 130° C., or the additivated bituminous binder is at a temperature in the vicinity of 160° C. and the aggregates are at a temperature between 100° C. and 150° C., preferably between 110° C. and 140° C. and more preferably between 120° C. and 130° C. Due to the large amount of aggregates with respect to the additivated bituminous binder (about 95% by weight of aggregates with respect to 5% by weight of additivated bituminous binder), it is the temperature of the aggregates which dictates the overall mixing temperature, which will thus be between 100° C. and 150° C., preferably between 110° C. and 140° C. and more preferably between 120° C. and 130° C.

It is preferable to use the aggregates at the temperature between 100° C. and 150° C., preferably between 110° C. and 140° C. and more preferably between 120° C. and 130° C. and the additivated bituminous binder at the same temperature between 100° C. and 150° C., preferably between 110° C. and 140° C. and more preferably between 120° C. and 130° C.

Given that the additivation of the bituminous binder with the modified alkylphenol-aldehyde resin does not influence the viscosity of the bituminous binder and does not decrease the viscosity, when the viscosity of the bituminous binder is too great to allow the bituminous binder to be pumped, it is then preferable to use the additivated bituminous binder at approximately 160° C. and the aggregates at a temperature between 100° C. and 150° C., preferably between 110° C. and 140° C. and more preferably between 120° C. and 130° C., the overall mixing temperature then all the same being between 100° C. and 150° C., preferably between 110° C. and 140° C. and more preferably between 120° C. and 130° C. In that case, the additivated bituminous binder is preferably at a temperature of between 120° C. and 180° C., preferably between 140° C. and 160° C., and the aggregates at a temperature between 100° C. and 150° C., preferably between 110° C. and 140° C. and more preferably between 120° C. and 130° C., the overall mixing temperature still being between 100° C. and 150° C., preferably between 110° C. and 140° C. and more preferably between 120° C. and 130° C.

Although the mixing temperature is lower in the process according to the invention, the mixing is of good quality and the mixing time has not increased in comparison with a conventional process at a higher temperature. Thus, the mixing time of the process according to the invention is between 2 seconds and 30 minutes, preferably between 5 seconds and 20 minutes, more preferably between 10 seconds and 10 minutes, more preferably still between 20 seconds and 5 minutes and more preferably still between 30 seconds and 1 minute. It is preferable for the kneading time or mixing time to be as short as possible in order to avoid the formation of fines and the change in distribution of the aggregates. It is not in any case necessary to have longer mixing times in the present invention and the target is even found to be as short as possible.

Once the aggregates are mixed, the additivated bituminous binder/aggregates mixture is spread. The processing temperature during the spreading of the bituminous binder/aggregates mixture is between 80° C. and 130° C., preferably between 90° C. and 120° C. and more preferably between 100° C. and 110° C. Everything is subsequently compacted and the compacting temperature of the spread mixture is between 70° C. and 120° C., preferably between 80° C. and 110° C. and more preferably between 90° C. and 100° C. The combination is subsequently cooled to ambient temperature.

The invention also relates to a bituminous mix capable of being obtained by the process as defined above. The mixture is comprised of a bituminous binder, aggregates and optionally fillers. The bituminous mix comprises from 1 to 10% by weight of additivated bituminous binder, preferably from 4 to 8% by weight, with respect to the total weight of the mix.

The invention also relates to the use of a modified alkylphenol-aldehyde resin as described above in a bituminous binder comprising at least one bitumen in order to decrease the manufacturing, processing and/or compacting temperatures during the preparation of a bituminous mix.

Process for the Preparation of an Asphalt:

The invention also relates to a process for the preparation of an asphalt in which a bituminous binder and fillers are mixed, the bituminous binder comprising at least one bitumen and at least one modified alkylphenol-aldehyde resin of the invention.

Preferably, in this process, the bituminous binder comprises from 0.1 to 5% by weight of modified alkylphenol-aldehyde resin, preferably from 0.5 to 3% by weight and more preferably from 0.5 to 2% by weight, with respect to the total weight of bituminous binder.

Advantageously, the manufacturing temperature is between 140° C. and 180° C., preferably between 150° C. and 170° C.

Preferably, the bituminous binder and the fillers are both at a temperature of between 140° C. and 180° C., preferably between 150° C. and 170° C., during their mixing.

It should be noted that, during the manufacture, the fillers and the additivated bituminous binder are both at the same temperature (between 140° C. and 180° C., preferably between 150° C. and 170° C.). Subsequently, the additivated bituminous binder/fillers mixture is poured. The processing temperature during the pouring of the bituminous binder/fillers mixture is between 120° C. and 160° C., preferably between 130° C. and 150° C. The combination is subsequently cooled to ambient temperature.

The invention also relates to an asphalt capable of being obtained by the process as defined above. The asphalts comprise a bituminous binder and inorganic fillers. Advantageously, the asphalt comprises from 1 to 20% by weight of additivated bituminous binder, preferably from 5 to 10% by weight, with respect to the total weight of the asphalt.

The invention also relates to the use of a modified alkylphenol-aldehyde resin as described above in a bituminous binder comprising at least one bitumen in order to decrease the manufacturing and/or processing temperatures during the preparation of an asphalt.

Bituminous Compositions:

Another subject-matter of the invention is a composition comprising asphaltenes, the said composition being chosen from bituminous binders, bituminous mixes and asphalts, the said composition comprising at least one modified alkylphenol-aldehyde resin which has been described above.

Preferably, the bituminous binder comprises from 0.1 to 5% by weight of modified alkylphenol-aldehyde resin, preferably from 0.5 to 3% by weight and more preferably from 0.5 to 2% by weight, with respect to the total weight of bituminous binder.

It is preferable to use an amount of additive which is as low as possible, for economic but also technical reasons. This is because, if the additive is present in a large amount in the bituminous binder, the properties of the bituminous binder, such as the penetrability, the ring and ball temperature, the viscosity, the adhesiveness or the complex modulus, and the properties of the bituminous mix obtained from the said bituminous binder, such as the Duriez strength, the resistance to rotting and the modulus, can be affected thereby and become too remote from those of the non additivated binder and of the mix obtained from the nonadditivated binder.

Mention may first of all be made, among the bitumens which can be used in the compositions according to the invention, of bitumens of natural origin, those present in natural bitumen or natural asphalt deposits or bituminous sands. The bitumens according to the invention are also bitumens originating from the refining of crude oil. The bitumens originate from the atmospheric and/or vacuum distillation of oil, it being possible for these bitumens to be optionally blown, visbroken and/or deasphalted. The different bitumens obtained by the refining processes can be combined with one another in order to obtain the best technical compromise. The bitumen can also be a recycled bitumen. The bitumens can be bitumens of hard grade or of soft grade. The bitumens according to the invention have a penetrability, measured at 25° C. according to Standard EN 1426, of between 5 and 200 $^{1}/_{10}$ mm, preferably between 10 and 100 $^{1}/_{10}$ mm, more preferably between 20 and 60 $^{1}/_{10}$ mm and more preferably still between 30 and 50 $^{1}/_{10}$ mm.

Preferably, the bituminous binder additionally comprises a polymer.

The polymers used are elastomers or plastomers. Mention may for example be made, by way of indication and without implied limitation, of thermoplastic elastomers, such as random or block copolymers of styrene and butadiene which are linear or star-branched (SBR, SBS) or of styrene and isoprene (SIS), copolymers of ethylene and vinyl acetate, copolymers of ethylene and propene, ethylene/propene/diene (EPDM) terpolymers, acrylonitrile/butadiene/styrene (ABS) terpolymers, olefinic homopolymers and copolymers of ethylene (or propylene or butylene), polyisobutylenes, polybutadienes, polyisoprenes, poly(vinyl chloride)s, rubber granules, butyl rubbers, polychloroprenes, polynorbornenes, polybutenes, polyisobutenes, polyethylenes or also any polymer used for the modification of bitumens, and their mixtures.

The preferred polymers are copolymers of styrene and butadiene. The copolymer of styrene and butadiene advantageously has a content by weight of styrene ranging from 5 to 50% by weight, preferably from 20 to 40%, with respect to the weight of copolymer.

The copolymer of styrene and butadiene advantageously has a content by weight of butadiene ranging from 50 to 95% by weight, preferably from 60 to 80%, with respect to the weight of copolymer.

Among the butadiene units, a distinction is made between the units comprising 1,4 double bonds resulting from butadiene and the units comprising 1,2 double bonds resulting from butadiene. The term "units comprising 1,4 double bonds resulting from the butadiene" is understood to mean the units obtained via a 1,4 addition during the polymerization of butadiene. The term "units comprising 1,2 double bonds resulting from the butadiene" is understood to mean the units obtained via a 1,2 addition during the polymerization of the butadiene. The result of this 1,2 addition is a vinyl double bond referred to as "pendant".

The copolymer of styrene and butadiene has a content of units comprising 1,2 double bonds resulting from the butadiene of between 5 and 50% by weight, preferably between 10 and 40%, more preferably between 15 and 30%, more preferably still between 20 and 25% and more preferably still between 18 and 23%, with respect to the total weight of the butadiene units.

The hydrocarbon copolymer of styrene and butadiene has an average molecular weight Mw of between 4000 and 500 000 daltons, preferably between 10 000 and 200 000, more preferably between 50 000 and 150 000, more preferably still between 80 000 and 130 000 and more preferably still between 100 000 and 120 000. The molecular weight of the copolymer is measured by GPC chromatography with a polystyrene standard according to Standard ASTM D3536 (replaced by Standard ASTM D5296-05).

The copolymer of styrene and butadiene can be linear or star-branched, in the diblock or triblock form, and/or can be multibranched. The hydrocarbon copolymer of styrene and butadiene can also optionally comprise a random hinge. A blend of copolymers of styrene and butadiene can be envisaged.

Use is generally made of an amount of polymer of 1 to 20% by weight, preferably of 5 to 10% and more preferably of 2 to 4%, with respect to the weight of bituminous binder.

This polymer can optionally be crosslinked. The crosslinking agents which can be used are very varied in nature and are chosen as a function of the type(s) of polymer(s) present in the bituminous binder according to the invention. Preferably, the crosslinking agent is chosen from sulphur, alone or as a mixture with vulcanization accelerators. These vulcanization accelerators are either hydrocarbyl polysulphides, or sulphur-donating vulcanization accelerators, or non-sulphur-donating vulcanization accelerators. The hydrocarbyl polysulphides can be chosen from those which are defined in Patent FR 2 528 439. The sulphur-donating vulcanization accelerators can be chosen from thiuram polysulphides, such as, for example, tetrabutylthiuram disulphides, tetraethylthiuram disulphides and tetramethylthiuram disulphides. The non-sulphur-donating vulcanization accelerators which can be used according to the invention can be sulphur-based compounds chosen in particular from mercaptobenzothiazole and its derivatives, dithiocarbamates and their derivatives and thiuram monosulphides and their derivatives. Mention may be made, for example, of zinc 2-mercaptobenzothiazole, zinc dibutyldithiocarbamate or tetramethylthiuram monosulphide. For further details with regard to the sulphur-donating and non-sulphur-donating vulcanization accelerators which can be used according to the invention, reference may be made to Patents EP 0 360 656, EP 0 409 683 and FR 2 528 439. Use is generally made of an amount of crosslinking agent of 0.05 to 2% by weight, preferably of 0.1 to 1% and more preferably still of 0.2 to 0.5%, with respect to the weight of bituminous binder.

The bituminous binder according to the invention can also comprise fluxes, such as oils based on animal and/or vegetable fatty substances or hydrocarbon oils of petroleum origin. The oils of animal and/or vegetable origin can be in the form of free fatty acids, of triglycerides, of diglycerides, of monoglycerides or in the esterified form, for example in the methyl ester form.

The bituminous binder according to the invention can also comprise waxes of animal, vegetable or hydrocarbon origin, in particular long-chain hydrocarbon waxes, for example polyethylene waxes or Fischer-Tropsch waxes. The polyethylene waxes or the Fischer-Tropsch waxes can optionally be oxidized. Amide waxes, such as ethylene bis(stearamide), can also be added.

The bituminous binder according to the invention can also comprise resins of vegetable origin, such as rosins.

The bituminous binder according to the invention can also comprise acids, such as polyphosphoric acid, or diacids, in particular fatty diacids.

The bituminous binder can also comprise adhesion agents and/or surface-active agents. They are advantageously chosen from alkylamine derivatives, alkylpolyamine derivatives, alkylamidopolyamine derivatives and derivatives of quaternary ammonium salts, taken alone or as a mixture. The most widely used are tallow propylenediamines, tallow amidoamines, quaternary ammoniums obtained by quaternization of tallow propylenediamines, and tallow propylenepolyamines.

It might also be possible to add sorbitol derivatives, hydrazide derivatives or derivatives of imidazolidinone type.

The modified alkylphenol-aldehyde resin additive makes it possible to prepare mixes and asphalts at lower manufacturing, processing and compacting temperatures than those conventionally used, this being the case with very low contents in the bituminous binder. The term thus used is process for the preparation of "tepid" bituminous mixes and asphalts and no longer "hot" bituminous mixes and asphalts. This additive makes possible a very good adhesiveness and wettability of the bituminous binder with respect to the aggregates and the bituminous binder is highly manageable, this being the case even at lower temperatures than those conventionally employed.

The use of this additive makes it possible to lower the said temperatures of all the bitumens (bitumens of hard grade, bitumens of intermediate grade, bitumens of soft grade), whatever their penetrability. Thus, the additive is suitable for bitumens with a penetrability of between 35 and 50 1/10 mm and for bitumens with a penetrability of between 10 and 20 1/10 mm.

This additive makes it possible to lower the said temperatures while retaining the mechanical properties of the bituminous mixes and mastic asphalts, this being the case with very low contents of additives.

Another subject-matter of the invention is the use of bituminous binders, mixes and mastic asphalts according to the invention in the manufacture of coverings of roads, of carriageways, of pavements, of roadways, of urban developments, of ground surfaces, of watertightness of buildings or of works, in particular in the manufacture in the application to roads of foundation courses, base courses, bedding courses, surface courses, such as binder courses and/or wearing courses.

EXPERIMENTAL PART

A—Materials and Methods
Crude Oils:
Three crude oils having different compositions were used:
CO1: Oil comprising 15% by weight of asphaltenes, characterized by an ASCI grade of 9
CO2: Oil comprising 10% by weight of asphaltenes, characterized by an ASCI grade of 11
CO3: Oil comprising 5% by weight of asphaltenes, characterized by an ASCI grade of 12
The ASCI (Asphaltene Solubility Class Index) method is described in N. Passade Boupat et al., SPE-164184-MS, Society of Petroleum Engineers, 2013; M. Rondon-Gonzalez et al., SPE-171891-MS, Society of Petroleum Engineers, 2014.

Additives:
Ad1: Modified nonylphenol-aldehyde resin prepared according to the procedure No. 1 Stage 1 followed by Stage 2 below—formulated in a $C_{10}$ aromatic solvent (of the Solvarex 10 type) at a concentration of 50% by weight of active material.
Ad2: Polyisobutylenesuccinimide, sold by Total ACS (Total Marketing & Services)—formulated in a $C_{10}$ aromatic solvent (of the Solvarex 10 type) at a concentration of 50% by weight of active material.
Ad3: Octadecylsuccinimide—sold by Total ACS under the reference HFAS 100—formulated in a $C_{10}$ aromatic solvent (of the Solvarex 10 type) at a concentration of 27.5% by weight of active material.
Ad4: Unmodified nonylphenol-aldehyde resin—formulated in a $C_{10}$ aromatic solvent (of the Solvarex 10 type)—obtained by the procedure No. 1 Stage 1 described below.
Ad5: Unmodified nonylphenol-aldehyde resin of low weight—formulated in a $C_{10}$ aromatic solvent (of the Solvarex 10 type)—obtained by the procedure No. 1 Stage 1 described below.

The characteristics of the resins Ad4 and Ad5 are listed in the following Table 1:

| Reference | Alkyl chain | Active material content (*) | Mw (Da) (**) |
|---|---|---|---|
| Ad4 | $C_9$ | 67.10% | 5000 |
| Ad5 | $C_9$ | 70.60% | 2500 |

(*) % by weight, in solution in toluene
(**) weight-average molar mass

Ad6: $C_{12}$-$C_{14}$ polyacrylates, with a weight-average molar mass Mw=12 000 Da—formulated in a $C_{10}$ aromatic solvent (of the Solvarex 10 type) at a concentration of 35% by weight of active material.
Ad7: $C_{18}$-$C_{22}$ polyacrylates, with a weight-average molar mass Mw=12 000 Da—formulated in a $C_{10}$ aromatic solvent (of the Solvarex 10 type) at a concentration of 35% by weight of active material.

Procedure No. 1: Synthesis of the Modified Alkylphenol-Aldehyde Resin
Stage 1:
In a first stage, an alkylphenol-aldehyde resin is prepared by condensation of para-nonylphenol and formaldehyde (for example according to the procedure described in EP 857 776), with a viscosity at 50° C. of between 1800 and 4800 mPa·s (viscosity measured at 50° C. using a dynamic rheometer with a shear rate of 10 $s^{-1}$ on the resin diluted with 30% by weight of aromatic solvent (Solvesso 150 ®)).

Stage 2:
In a second stage, the alkylphenol-aldehyde resin resulting from the first stage is modified by a Mannich reaction by addition of 2 molar equivalents of formaldehyde and 2 molar equivalents of tallow dipropylenetriamine, known under the name N-(tallowalkyl)dipropylenetriamine and sold, for example, under the name Trinoram S®, with respect to the alkylphenol-aldehyde resin resulting from the first stage.

The characteristics of the resin obtained on conclusion of Stage 2 are listed in the following Table 2:

TABLE 2

| Resin No. | Alkylamine used | Solids content (1 g/30 min/ 200° C.) | Viscosity at 50° C. (mPa · s) (*) | $N_{Phe}$ (**) |
|---|---|---|---|---|
| Ad1 | Trinoram S ® | 70.10% | 4855 | 14.1 |

(*) Viscosity at 50° C.: measured on a resin diluted with 70% by weight of Solvesso 150 ®, shear rate of 10 $s^{-1}$, using a Haake RheoWin ® rheometer.
(**) Evaluation of the mean number of phenol nuclei per resin molecule or $N_{Phe}$: measured by proton nuclear magnetic resonance.

Figure 1:
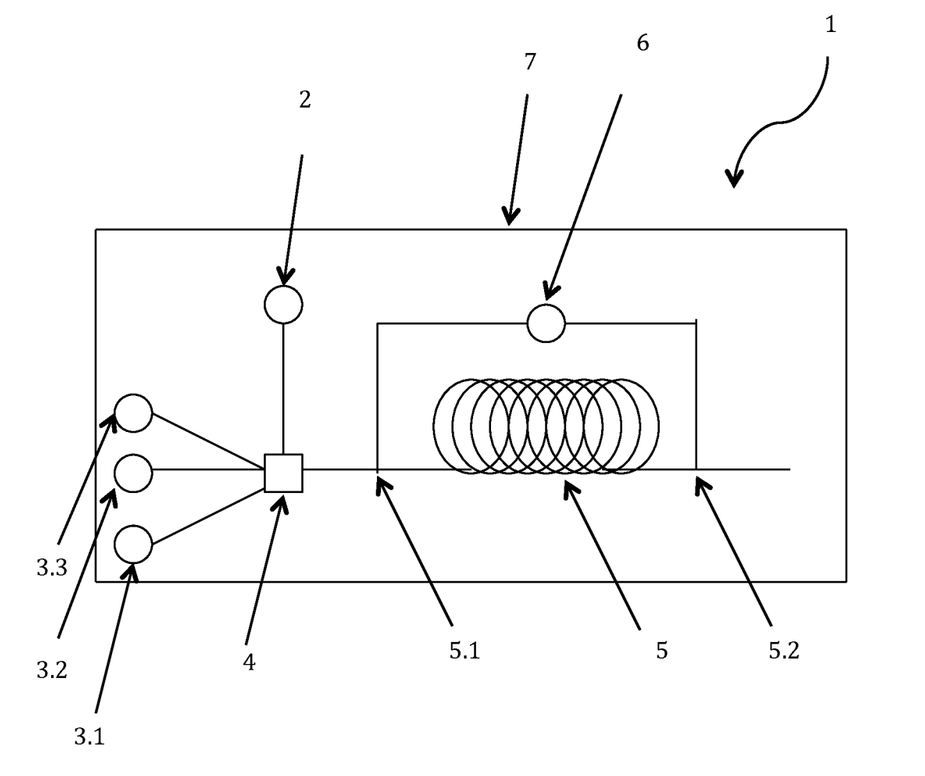
FIG. 1: Schematic representation of the pilot-scale unit for pressure performance evaluation.

B—Experiments:
Study of Resistance to Clogging:
The study is carried out in a pilot-scale unit (1), the different components of which are illustrated in FIG. 1.
The objective of the test is the study of the kinetics of precipitation and of clogging of asphaltenes in a capillary tube under continuous flow conditions. The principle of the measurement consists of the injection into a capillary tube of a mixture of crude oil and solvent at a predetermined and constant flow rate. The drop in pressure along the capillary tube is measured. The difference in pressure AP (in Pa) is related to the flow (in $m^3$/s) by the Hagen-Poiseuille law:

$$\Delta P = \frac{8n}{\pi R^4} LQ$$

in which R and L respectively represent the radius (in metres) and the length (in metres) of the capillary and n represents the viscosity of the fluid (in Pa·s). When a deposit of asphaltenes is formed in the capillary, R decreases, which results in an increase in P. The pumps are equipped with a safety system which halts the injection when the pressure reaches 8 bar.

The sample can be composed of crude oil, solvent and additives in varied proportions. The precipitation of the asphaltenes can be brought about by the mixing of a light aliphatic solvent with the crude oil.

The experimental device represented in FIG. 1 comprises four syringes actuated by pumps (PHD Ultra 4400, Harvard Apparatus) which converge in a static mixer (4) located at the inlet (5.1) of the capillary. The pump (2) is used to inject the crude oil. The pumps (3.1) and (3.2) are used to respectively inject a solution of additive (in toluene) and a solvent, such as heptane. The final pump (3.3) is used to clean the circuit or to calibrate the system with toluene. Before entry into the static mixer (4), the crude oil, the additive(s) and the solvents are conditioned in the oven (7) at a controlled temperature of 45° C. The combined materials are mixed using the static mixer (4) and then injected at the inlet (5.1) of the capillary tube (5) with a length of 3 m and a diameter of 0.38 mm. The entire device is placed in the oven (7), so as to maintain a controlled temperature of 45° C. The pressure drop between the inlet (5.1) and the outlet (5.2) of the capillary (5) is measured in real time using piezoelectric transducers (6) connected to the ends (5.1) and (5.2) of the capillary.

Principle of the Test:

In a first test (Protocol 1), a determination is carried out of the Oil/Heptane ratio prior to the capillary test in order to determine the conditions for precipitation of the asphaltenes. Subsequently, the oil and the nonadditivated heptane are injected into the capillary (5) with the heptane/oil ratio identified in the first stage, which makes it possible to determine an initial blocking time of the capillary (5). Subsequently (Protocol 2), by virtue of the additive, this blocking time is shifted to greater times.

Protocol 1: Additive Concentration Scanning Test

In this test, the additive is injected into the capillary (5) in several stages, along a decreasing gradient of additive concentration with respect to the oil. The additive is in solution in heptane and the solution of additive dissolved in heptane exhibits a fixed concentration. Firstly, toluene is injected, followed by the heptane and the oil.

The crude oil/heptane ratio is kept constant during the test and the additive solution/heptane ratio decreases at each stage, as is summarized in Table 3. Each stage has a duration of 210 minutes. The objective of this experiment is to determine the additive concentration ranges within which the additive has an effect on the dispersion of the asphaltenes.

For the crude oil tested (CO2, but this protocol can be employed with any crude oil), the start of precipitation of the crude oil (control) was determined as a ratio of 3 volumes of heptane per one volume of oil: Heptane/Oil=3.

TABLE 3

| | | | Flow rates (µL/min) | | | |
|---|---|---|---|---|---|---|
| Stage | Duration (min) | Amount of additive (ppm) | Toluene | Crude oil | Heptane | Solution of additive in heptane |
| 1 | 90 | 0 | 150 | 0 | 0 | 0 |
| 2 | 210 | 10 000 | 0 | 50 | 50 | 100 |
| 3 | 210 | 3000 | 0 | 50 | 120 | 30 |
| 4 | 210 | 1000 | 0 | 50 | 140 | 10 |
| 5 | 210 | 300 | 0 | 50 | 147 | 3 |

Protocol 2: Test at a Fixed Concentration of Additive

After an analysis of the limiting concentration, a given concentration for each additive can be selected for which the threshold performances are identified. Thus, for this part of the test, for the additive according to the invention Ad1, a constant flow of 1000 ppm of the additive dissolved in heptane is injected into the capillary with the crude oil, the volume ratio 3:1 heptane:crude oil being retained. The corresponding flow rates are summarized in Table 4. The temperature was fixed at 45° C. in each test. The objective of this test is to determine the action of the additive over time, at a given dose, under flow conditions. The time at the end of which the pressure of 8 bar is reached is measured.

TABLE 4

| | | | Flow rates (µL/min) | | |
|---|---|---|---|---|---|
| Stage | Duration (min) | Amount of additive (ppm) | Toluene | Crude oil | Additive solution |
| 1 | 90 | 0 | 150 | 0 | 0 |
| 2 | 840 | 1000 | 0 | 50 | 150 |

The time at the end of which the pressure of 8 bar is reached is subsequently determined for different concentrations and for varied additives. The greater the time in order to reach this pressure of 8 bar, the greater the effectiveness of the additive as dispersant for asphaltenes.

C—Results:

The results are given in Tables 5, 6 and 7 below:

TABLE 5

Results of the pressure performance test for the oil CO1

| | CO1 | | |
|---|---|---|---|
| Oil Additive | Additive concentration (*) | Additive dosage as active material (ppm) | Result (h) |
| Without additive | | | 3.5 |
| Ad1 | 50% | 1000 | 8 |
| Ad1 | 50% | 700 | 9.5 |
| Ad2 | 50% | 1000 | 3.5 |
| Ad3 | 27.5% | 550 | 6.2 |
| Ad3 | 27.5% | 1000 | 7 |
| Ad4 | 67.1% | 1000 | 5.3 |
| Ad5 | 70.6% | 1000 | 3 |

TABLE 6

Results of the pressure performance tests for the oil CO2

| | CO2 | | |
|---|---|---|---|
| Oil Additive | Additive concentration (*) | Additive dosage as active material (ppm) | Result (h) |
| Without additive | | | 3.5 |
| Ad1 | 50% | 1000 | >12 |
| Ad1 | 50% | 700 | — |
| Ad2 | 50% | 1000 | 9 |
| Ad3 | 27.5% | 700 | — |
| Ad3 | 27.5% | 550 | 4.5 |
| Ad4 | 67.1% | 700 | — |
| Ad5 | 70.6% | 700 | — |
| Ad6 | 35% | 700 | — |
| Ad7 | 35% | 700 | 9 |

TABLE 7

Results of the pressure performance tests for the oil CO3

| | CO3 | | |
|---|---|---|---|
| Oil Additive | Additive concentration (*) | Additive dosage as active material (ppm) | Result (h) |
| Without additive | | | 3 |
| Ad1 | 50% | 1000 | >12 |
| Ad2 | 50% | 1000 | 9 |
| Ad3 | 27.5% | 550 | 7 |
| Ad7 | 35% | 700 | 8 |

(*) concentration by weight of the additive in the solvent

The modified alkylphenol-aldehyde resins according to the present invention are noteworthy in that they are particularly effective in dispersing the asphaltenes and/or in preventing and/or delaying and/or stopping and/or reducing the precipitation of the asphaltenes over a broad range of crude oils, in comparison with the dispersing additives for asphaltenes of the prior art.

The invention claimed is:

1. Method for dispersing asphaltenes and/or for at least one of preventing, delaying, stopping, and reducing the precipitation of asphaltenes comprised in a composition of crude oils, in a hydrocarbon fraction of crude oils comprising asphaltenes, or in a product selected from the group consisting of bituminous binders, bituminous mixes, and asphalts and comprising asphaltenes, said method comprising adding to said composition, said hydrocarbon fraction, or said product at least one modified alkylphenol-aldehyde resin, the modified alkylphenol-aldehyde resin being obtained by a Mannich reaction of an alkylphenol-aldehyde condensation resin with
   at least one aldehyde and/or one ketone having from 1 to 8 carbon atoms;
   and at least one hydrocarbon compound having at least one alkylamine group having between 1 and 30 carbon atoms,
   the alkylphenol-aldehyde condensation resin being itself obtained by condensation
   of at least one alkylphenol substituted by at least one linear or branched alkyl group having from 1 to 30 carbon atoms,
   with at least one aldehyde and/or one ketone having from 1 to 8 carbon atoms.

2. Method according to claim 1, wherein the composition of crude oils, the hydrocarbon fraction of crude oils comprising asphaltenes, or the product selected from the group consisting of bituminous binders, bituminous mixes, and asphalts and comprising asphaltenes is subjected to one or more of the following conditions:
   a rise in pressure,
   a rise in temperature,
   a mixing with at least one other fluid.

3. Method according to claim 1, wherein the modified alkylphenol-aldehyde resin is obtained from p-nonylphenol, formaldehyde and at least one hydrocarbon compound having at least one alkylmonoamine or alkylpolyamine group.

4. Method according to claim 1, wherein the modified alkylphenol-aldehyde resin added to said composition, said hydrocarbon fraction, or said product is diluted in a solvent.

5. Method according to claim 1, executed in an equipment selected from the group consisting of a tank, a refining plant, a pipeline, a drilling well, an item of transportation equipment, and a filter.

6. Method according to claim 1, applied to a product derived from a composition of crude oils selected from the group consisting of bituminous binders, bituminous mixes and asphalts.

7. Method according to claim 1, for reducing a preparation temperature and/or a processing temperature of the bituminous binder and/or for reducing a manufacturing, processing and/or compacting temperature during preparation of a bituminous mix and/or for reducing a manufacturing and/or a processing temperature during preparation of an asphalt.

8. Composition comprising asphaltenes chosen from: bitumen compositions, bituminous binders, bituminous mixes and asphalts,
   the said composition comprising at least one modified alkylphenol-aldehyde resin capable of being obtained by a Mannich reaction of an alkylphenol-aldehyde condensation resin with
      at least one aldehyde and/or one ketone having from 1 to 8 carbon atoms;
      and at least one hydrocarbon compound having at least one alkylamine group having between 1 and 30 carbon atoms,
   the said alkylphenol-aldehyde condensation resin being itself capable of being obtained by condensation
      of at least one alkylphenol substituted by at least one linear or branched alkyl group having from 1 to 30 carbon atoms,
      with at least one aldehyde and/or one ketone having from 1 to 8 carbon atoms.

9. Composition according to claim 8, wherein the modified alkylphenol-aldehyde resin is obtained from at least one alkylmonoamine or from at least one alkylpolyamine having at least one primary amine group.

10. Composition according to claim 9, wherein the modified alkylphenol-aldehyde resin is obtained from at least one alkylmonoamine or from at least one alkylpolyamine which all the amine groups are primary amines.

11. Composition according to claim 8, wherein the alkylamine is a fatty alkylmonoamine having from 12 to 24 carbon atoms.

12. Composition according to claim 8, wherein the alkylamine is a fatty alkylpolyamine having from 12 to 24 carbon atoms.

13. Composition according to claim 8 which is a bituminous binder comprising from 0.1 to 5% by weight of modified alkylphenol-aldehyde resin, with respect to the total weight of binder.

14. Composition according to claim 8, which is a bituminous mix comprising from 1 to 10% by weight of bituminous binder, wherein the modified alkylphenol-aldehyde resin is obtained from at least one alkylmonoamine or from at least one alkylpolyamine having at least one primary amine group, and from 90 to 99% by weight of aggregates, with respect to the total weight of the mix.

15. Composition according to claim 8, which is an asphalt comprising from 1 to 20% by weight of bituminous binder, wherein the modified alkylphenol-aldehyde resin is obtained from at least one alkylmonoamine or from at least one alkylpolyamine having at least one primary amine group, and from 80 to 99% of fillers, with respect to the total weight of the asphalt.

16. Method according to claim 1, for the treatment of the composition of crude oils, the hydrocarbon fraction of crude oils comprising asphaltenes, or the product selected from the group consisting of bituminous binders, bituminous mixes and asphalts and comprising asphaltenes, said method comprising at least:
- (i) introducing at least one modified alkylphenol-aldehyde resin into the composition of crude oils, the hydrocarbon fraction of crude oils comprising asphaltenes, or the product selected from the group consisting of bituminous binders, bituminous mixes and asphalts and comprising asphaltenes,
- (ii) a treatment stage selected from the group consisting of a rise in pressure, a rise in temperature, and a mixing with at least one other fluid, the modified alkylphenol-aldehyde resin being obtained by a Mannich reaction of an alkylphenol-aldehyde condensation resin with
- at least one aldehyde and/or one ketone having from 1 to 8 carbon atoms;
- and at least one hydrocarbon compound having at least one alkylamine group having between 1 and 30 carbon atoms, the alkylphenol-aldehyde condensation resin being itself obtained by condensation
- of at least one alkylphenol substituted by at least one linear or branched alkyl group having from 1 to 30 carbon atoms,
- with at least one aldehyde and/or one ketone having from 1 to 8 carbon atoms.

17. Method according to claim 16, wherein the treatment is carried out at any stage from recovery of the crude oils from a reservoir up to refining and use of the hydrocarbon fractions, via transportation of these different products.

18. Method according to claim 16 for the preparation of a bituminous binder, wherein the treatment stage (ii) comprises mixing the bitumen and the modified alkylphenol-aldehyde resin at a temperature of between 100° C. and 170° C.

19. Method according to claim 16 for the preparation of a bituminous mix, wherein the treatment stage (ii) comprises mixing the bituminous binder and aggregates at a temperature between 100° C. and 150° C.

20. Method according to claim 16 for the preparation of an asphalt, wherein the treatment stage (ii) comprises mixing the bituminous binder and fillers, at a temperature of between 140° C. and 180° C.

* * * * *